United States Patent [19]
Mann

[11] 3,782,760
[45] Jan. 1, 1974

[54] CUSHIONED ADJUSTABLE SWING HITCH FOR VEHICLE

[76] Inventor: Frederick W. Mann, Waterville, Kans. 66548

[22] Filed: Dec. 6, 1972

[21] Appl. No.: 312,566

Related U.S. Application Data

[63] Continuation-in-part of Ser. No. 89,858, Nov. 16, 1970, Pat. No. 3,718,347.

[52] U.S. Cl. ............. 280/467, 280/478 R, 280/483, 280/491 B
[51] Int. Cl. .............................................. B60d 1/00
[58] Field of Search ............ 280/467, 478 R, 478 A, 280/478 B, 491 B, 491 R, 483

[56] References Cited
UNITED STATES PATENTS

| | | | |
|---|---|---|---|
| 3,169,028 | 2/1965 | Scrivner | 280/478 R |
| 3,397,900 | 8/1968 | Sturges | 280/478 R |
| 3,410,577 | 11/1968 | Luinstra | 280/478 A |
| 3,718,347 | 2/1973 | Mann | 280/491 B |

*Primary Examiner*—Leo Friaglia
*Attorney*—John H. Widdowson

[57] ABSTRACT

A hitch for vehicles includes a mounting and a hitch pivotal, extendable and translatable relative the mounting with a cushion connectable between the hitch and the mounting. A resilient lock secures the cushion of the hitch with the mounting. The hitch mounts on the rear of a vehicle with a hitch that is translatably positionable on the mounting, and is rotatably and extendably positionable therefrom to be coupled with a trailer vehicle, or the like, then retracted to a locked position with the cushion absorbing impact forces.

7 Claims, 8 Drawing Figures

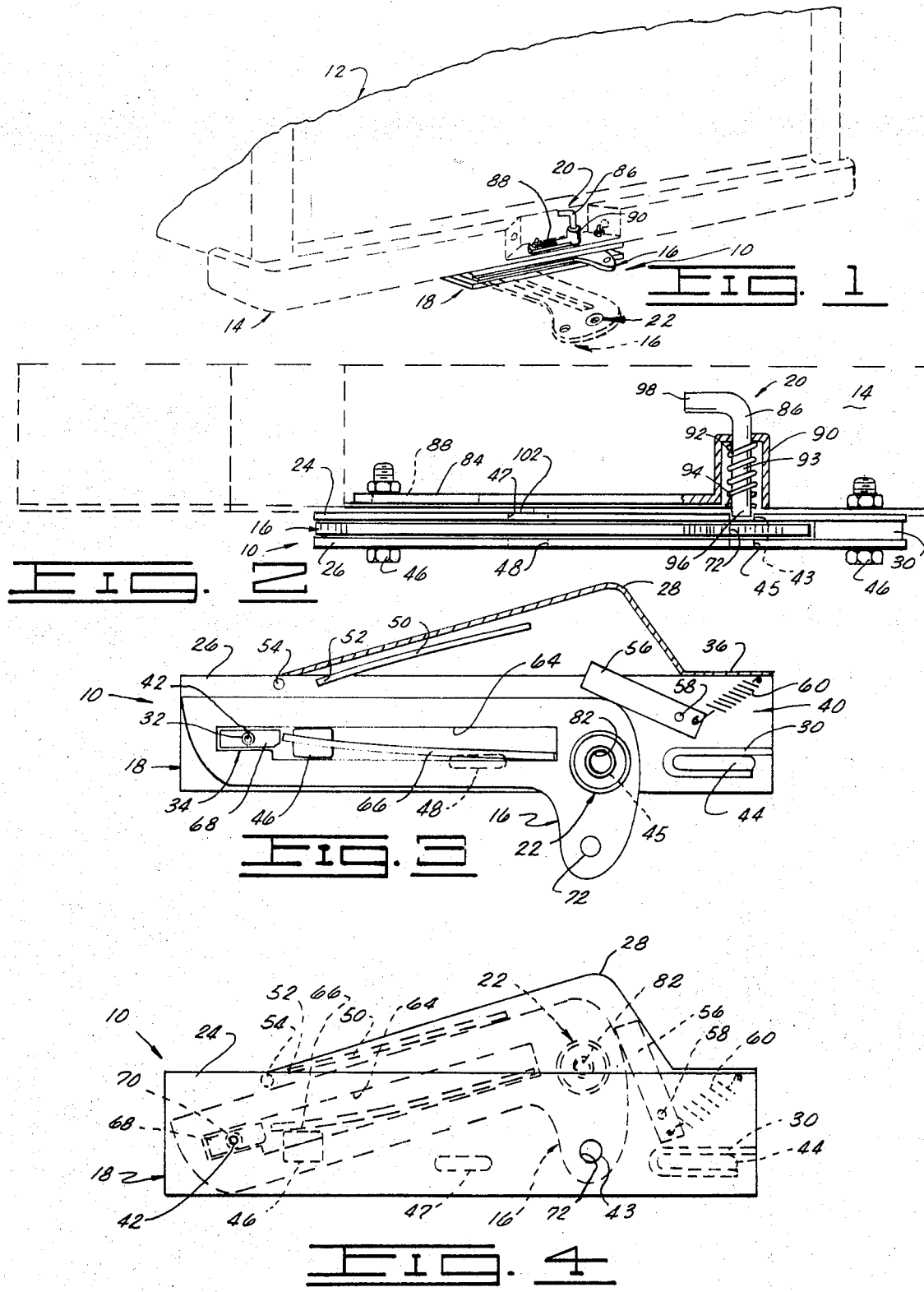

CUSHIONED ADJUSTABLE SWING HITCH FOR VEHICLE

This application is a continuation-in-part application of my allowed application entitled ADJUSTABLE SWING HITCH FOR VEHICLES, filed Nov. 16, 1970, having U.S. Pat. Ser. No. 89,858 and is now U.S. Pat. No. 3,718,347.

Numerous types of extendable and retractable hitches for vehicle couplings are known in the prior art as operable to be mounted with a vehicle and which have two functional positons, an extended position for coupling with another vehicle and a storage position which the hitch assumes when not in use. The general structure of these prior art devices consists of a tongue or the like which is pivotally attached at one end to a supporting structure on the towing vehicle or on its bumper and attachable on its opposite end with a towed vehicle such as a trailer or the like. When the prior art devices are in the use position, the tongue is held in a fixed position relative to the towing vehicle and is not pivotable or extendable from this fixed position to allow easy attachment to the towed vehicle. Many of these prior art extendable and retractable hitches are so constructed that the trailer vehicle or towed vehicle is couplable with the hitch only when the hitch is in the extended and fixed position. Also, these prior art devices have the tongue rigidly attached to the towing vehicle; therefore, shock and impact forces of the towed vehicle are transmitted directly to the towing vehicle. In my above-identified application for patent, having U.S. Pat. Ser. No. 89,858, an extendable and retractable hitch for vehicles is provided which has a bar extendably and translatably mountable with a vehicle which in its normal use position is rigidly mountable under the rear bumper of a towing vehicle.

In a preferred specific embodiment of this invention, a cushioned adjustable swing hitch for vehicles includes a mounting comprising a housing mountable with a vehicle having an extendably and translatably mounted hitching bar used for attachment with a trailer vehicle or the like which is lockable with the housing and isolated therefrom by a shock-absorbing cushion. The hitching bar is retractable into the housing for storage purposes and positionable for use in a laterally fixed position. The mounting housing includes a pair of parallel plate members joined on one side making the housing a partial enclosure; the parallel plate members are provided with apertures for mounting same with a vehicle and are adapted to receive and hold therebetween and therein same the hitching bar member. The hitching bar member is an elongated bar-like member and includes an end portion having an aperture connectable with a towed vehicle such as a trailer, a cushion insert member lockable with the housing, and a slot extending through the center portion thereof. A floating member mounted in the slot is adapted to provide pivotable, extendable and translatable movements of the bar member within the housing and about the slot so as to rotate, translate and extend the hitching bar relative to the housing. A lock is provided to prevent inadvertent translational movement of the hitching bar member relative to the floating member. Another lock is provided to hold the hitching bar member in a fixed normal use position and in a storage position, the lock being engagable with the cushion member in the hitching bar member. The cushioned adjustable swing hitch of this invention can be stored in an out-of-the-way position enclosed within the housing or it can be extended for coupling with a towed vehicle and positioned for use in a normal use position once it has been coupled with a towed vehicle. The bar member of the hitch is extendable, rotatable and translatable relative to the housing to allow for coupling of same with a towed vehicle such as a trailer, then by forward and rearward movement of the towing vehicle returned to the normal use position wherein the lock is automatically secured with the cushion member for normal towing use of the hitch. In operation the cushioned adjustable swing hitch for vehicles of this invention provides a softening of the impact and shock forces of the towed vehicle which would otherwise be transmitted directly to the towing vehicle. The cushioned member absorbs a portion of the shock and impact loading forces which would otherwise be transmitted to the towing vehicle if the hitch were a rigid or substantially rigid connection between the vehicles.

One object of this invention is to provide an adjustable swing hitch for vehicles overcoming the aformentioned disadvantages of the prior art devices.

Still, one object of this invention is to provide a cushioned adjustable swing hitch for vehicles with a hitching bar member extendable therefrom in a translatable and rotatable manner for coupling with a trailer vehicle or the like and retractable to a locked position for use with a cushioned connection between the hitching bar member and a mounting housing.

Still, another object of this invention is to provide a cushioned adjustable swing hitch for vehicles which can be positioned for use in a plurality of translatably different centered and off-centered lateral positions for use and which can be positioned in an out-of-the-way storage position.

Yet, another object of this invention is to provide a cushioned adjustable swing hitch for vehicles having the hitching bar member mounted with the housing by a floating member movable through a slot portion of the hitching bar member and having a lock to secure the floating member relative to the hitching bar member and provide for extendable, retractable and translatable positioning of the hitching bar member relative to the housing and having another lock with the housing engagable with a cushion element in the hitching bar member to hold the hitching bar in a substantially fixed position for use and the lock engagable with another aperture in the hitching bar member to hold it in a fixed position for storage.

Yet, one further object of this invention is to provide a cushioned adjustable swing hitch for vehicles having a cushion insert member in the hitching bar member, the cushion being constructed of a resilient material and removably replaceable in the hitching bar member.

Yet, an additional object of this invention is to provide a cushioned adjustable swing hitch for vehicles which has a lock that is mounted with a vehicle bumper and is adapted to secure the hitching bar member to the housing which is mounted by a locking pin passable through apertures in the housing and particularly through an aperture in the cushion member to lock the hitch in a normal use position, and passable through an aperture in the hitching bar member to lock the hitching bar member in a storage position.

Various other objects, advantages, and features of the invention will become apparent to those skilled in the art from the following discussion, taken in conjunction with the accompanying drawings, in which:

FIG. 1 is a perspective view of the rear bumper portion of a vehicle having the cushioned adjustable hitch mounted therewith with the hitch shown in the normal use position and also shown in dashed lines in an extended and pivoted position;

FIG. 2 is a rear elevation view of the hitch and adjacent portions of the bumper in the normal use position with the locking pin raised and having portions removed for clarity;

FIG. 3 is a top plan view of the cushioned adjustable hitch in the normal use position with the top portion of the housing removed;

FIG. 4 is a top plan view of the cushioned adjustable hitch with the hitching bar member in the storage position;

Figure 5:
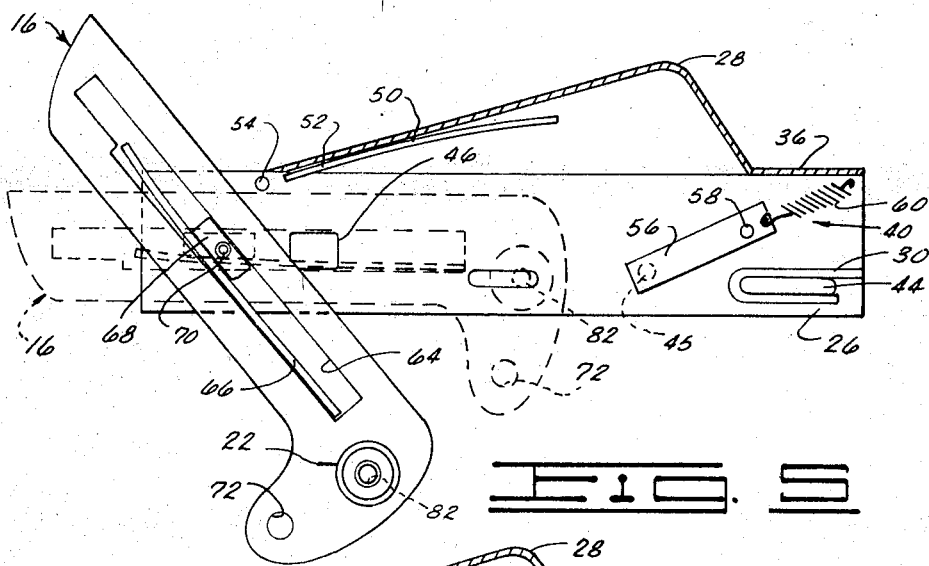
FIG. 5 is a top plan view of the cushioned adjustable hitch with the top portion of the housing removed, having the hitching bar member in a partially rotated, translated and extended position and showing in dashed lines with the hitching bar member in a translated off-center use position.

The following is a discussion and description of preferred specific embodiments of the cushioned adjustable swing hitch for vehicles of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a cushioned adjustable swing hitch of this invention is shown therein, and generally indicated at 10; it is mounted with the rear portion of a vehicle 12 on the bumper 14 thereof. The cushioned adjustable swing hitch 10 includes a hitching bar member 16 pivotally, extendably and translatably mounted with a mounting housing 18; a lock assembly 20 for securing the hitching bar member 16 in the housing 18; and a cushion element 22 in the end portion of the hitching bar member 16. The lock 20 engages with the cushion member 22 in the hitching bar member 16 for positioning the cushion adjustable swing hitch 10 in a normal use position as shown in the solid lines of FIG. 1.

The mounting housing 18 includes a pair of similar plate members, a top plate member 24 and a bottom plate member 26, joined in a spaced relation and having a connecting wall 28 on the normally forward side portion thereof so as to make the housing a partial enclosure. A feature of the partially closed housing is to protect the hitch from damage due to flying objects such as rocks, etc., and prevent the hitching bar member 16 from becoming jammed in the housing 18 by small stones and the like. The plate members 24 and 26 are supported in the spaced relation by a spacer member 30 on one end portion thereof, by the connecting wall 28 on a side portion thereof, and by a sleeve member 32 in the floating block assembly 34. The floating block assembly 34 is the support for one end portion of the hitching bar member 16. FIG. 3 shows in detail the preferred shape of the plate members including the generally triangular shaped extended portion thereof which is joined by the connecting wall 28. The connecting wall 28 connects the outer portions of the triangular portions of the plates 24 and 26 on the exposed side thereof and has another portion thereof, indicated at 36, joining an end portion of the plates to protect the locking pin holding assembly 40. A mounting aperture 42 extends through the plate members 24 and 26 and through the sleeve 32 in the floating block assembly 34 and another mounting aperture 44 through the plate members 24 and 26 adjacent to the spacer member 30. The apertures 42 and 44 are used for mounting of the mounting housing 18 with a vehicle bumper 14. Preferably, the cushioned adjustable hitch 10 is secured with the vehicle bumper 14 by bolts 46 fastened through the apertures 42 and 44. The mounting housing 18 has a pair of aligning apertures 43 and 45 through the upper and lower plates 24 and 26, respectively, forming a passageway for the bolt or pin of the lock 20. The lower plate member 26 is provided with an aperture indicated at 46 which is used for purposes of releasing the rotation lock assembly 34. The plates 24 and 26 have elongated apertures 47 and 48 used for off-center pulling as will be described hereinafter. Preferably, the aperture 44 is an elongated aperture as shown with the spacer member 30 partially encircling same to enable the hitch 10 to be bolted to bumpers having different relative spacings of the apertures.

Figure 6:
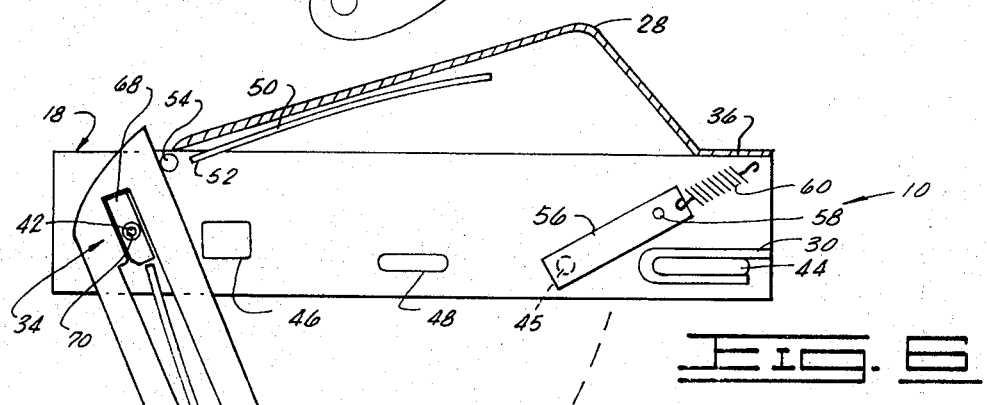
FIG. 6 is a top plan view of the cushioned adjustable hitch with the top portion of the housing removed having the hitching bar member in the full rotated and extended position.

The mounting housing 18 is a partially closed structure substantially open on three sides. Within the enclosed portion of the housing is a leaf spring 50 attached on its end 52, to the plate members 24 and 26. The leaf spring 50 is an ejector spring constructed and adapted to force the hitching bar member 16 from the enclosed portion of the mounting housing 18 when it is released from the storage position shown in FIG. 4. In the storage position the free end of the leaf spring 50 contacts and presses on the back side of the hitching bar member 16 with the hitching bar member 16 being retained by the lock 20. A hitching bar pivot stop indicated at 54 is secured between the plate members 24 and 26 and functions to contact the hitching bar member 16 as shown in FIG. 6 to prevent its over-the-center rotation. The hitching bar pivot stop 54 is used in coupling the hitch 10 with a towed vehicle as will be described in conjunction with using the hitch 10. A locking pin holder is used to prevent unwanted engagement of the lock 20. The locking pin holding apparatus 40 has a wedge member 56 pivotally mounted at a pin 58 and urged by a spring 60 so in a normal position it will block the bolt or locking pin of the locking apparatus 20. The pivotable wedge 56 in a free position covers the passageway formed by the locking bolt apertures 43 and 45 in the plate members 24 and 26 to prevent the bolt of the lock 20 from passing through space between the plates. The spring 60 is supported in the housing 18 in the general position shown in the drawings so the wedge 56 in the free position is in the position shown in FIG. 5 and FIG. 6. In the rotated position the wedge 56 assumes the position shown in FIGS. 3 and 4 depending upon whether the hitch 10 is in the normal use position or the storage position. The hitching bar member 16 is preferably shaped as shown in the drawings and has an elongated portion 61 connected on one end portion to the floating block assembly 34 and having an enlarged outer end portion 62.

Figures 7, 8:
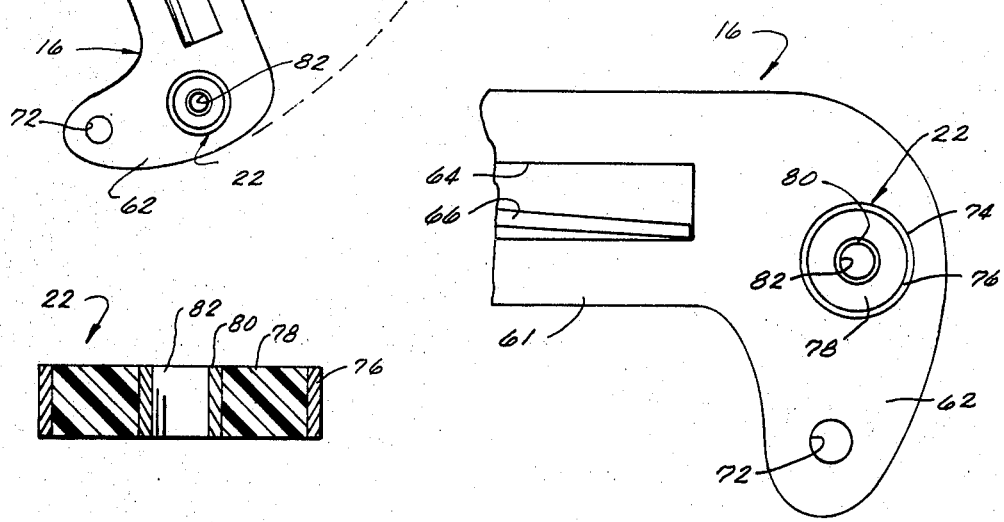
FIG. 7 is an enlarged top plan view of the outer end portion of the hitching bar member.
FIG. 8 is a cross-sectional elevation view of the cushion member for the hitching bar member.

FIG. 7 shows in detail the outer end portion of the hitching bar member 16. The hitching bar member 16 includes an elongated slot 64 therethrough same and extending substantially the length thereof with a leaf spring 66 attached to one side of the slot 64 at the outer end portion thereof and extending in the direction of the floating block assembly 34. The slot 64 is sized so as to accommodate the leaf spring 66 on one side thereof when the spring is compressed against that side and allow the floating block of the floating block assembly 34 to pass through the entire length of the slot and along the spring 66. The leaf spring 66 is curved slightly and has a free position shown in FIGS. 3, 4, and 6 and a compressed position shown in FIG. 5. The floating block assembly 34 includes a block member 68 having an aperture therethrough supported by the sleeve member 32 through the block's aperture so that it will freely rotate about the sleeve 32. The floating block member 68 has an elongated rectangular shape as shown in the drawings and is sized to freely slide through the slot 64. The sleeve 32 is secured to the plate members 24 and 26 and has the aperture 42 therethrough which is used for mounting the hitch 10 with a vehicle. On the pivotally attached end of the hitching bar member 16, it is shaped such that it will contact the hitching bar stop 54 as shown in FIG. 6 when in the full rotated position. The outer end of the hitching bar member 16 is preferably shaped as shown in FIG. 7 and has the cushion member 22 and a connecting aperture 72. The connecting aperture 72 is used in coupling the hitch 10 with a towed vehicle.

FIG. 7 and FIG. 8 show in detail the structure of the cushion member 22 and its mounting with the hitching bar member 16. Preferably, the cushion member 22 is removably mountable in an aperture 74 in the hitching bar's outer end portion 62, same being pressed into the aperture 74 and retained therein by an interference fit. The cushion insert member 22 includes an outer ring 76, a cushion ring 78 of a resilient material and on the interior thereof an inner ring 80. The outer ring 74 and inner ring 80 are preferably bonded to the resilient material ring 78. The cushion ring or resilient material ring 78 is preferably a material such as synthetic rubber which has suitable energy absorbing properties. The structure of the cushion member 22 is such that forces are transmitted to it from the hitching bar member 16, and absorbed by the cushion ring element 78 before being transmitted to the inner ring member 80. The inner portion of the inner ring member 80 is an aperture 82 which is rigidly connected to the vehicle's structure by the bolt of the lock assembly 20. The outer ring member 76 is rigidly connected to the hitching bar member 16 and the cushion element 78 provides the vibrational isolation between the hitching bar member 16 and the hitch housing 18 and attached vehicle structure. Preferably, the cushion insert member 22 is fitted in the aperture 74 so it can be removed and replaced as necessary.

It is to be noted that the position of the connecting aperture 72 and the aperture 82 of the cushion inner ring 80 are an important feature of the hitch 10 of this invention in that they are spaced the same distance from the pivot point of the floating block assembly 34 when it is in the position shown in FIG. 6. Positioning of the apertures 72 and 82 in this manner enables the bolt of the locking assembly 20 to pass through either of the apertures 72 or 82 to retain the hitch 10 in the storage position or in the normal use position, respectively.

FIG. 1 and FIG. 2 show in detail the structure of the lock assembly 20 and its mounted relation on a vehicle bumper 14 with the hitch housing 18. The lock assembly 20 includes a lock mount 84 and a spring urged locking bolt 86. The lock assembly 20 is positioned on the upper side of the vehicle bumper 14 with a portion of the vehicle bumper separating the lock assembly 20 and the mounting housing 18. The bumper 14, lock assembly 20 and housing 18 are shown in detail in FIG. 2. The mount 84 is an elongated member and has an elongated aperture 88 therethrough one end portion and a lock bolt support 90 on the opposite end. The aperture 88 is used for attaching the mount 84 to the vehicle bumper 14, as shown in FIG. 2, with the bolt 46. The lock bolt support 90 encloses a portion of the locking bolt 86 and a spring 92. The spring 92 is placed between the upper portion of the locking bolt support 90 and a pin 94 extending through the locking bolt 86. The spring 92 is in compression between the pin 94 and the upper portion of the support so as to force the locking bolt 86 downward into the hitch mounting housing 18. The locking bolt 86 has a shank portion 93 around which the spring 92 is positioned, a lower end portion 96 extending past the pin 94 on one end of the shank 93 and a handle portion 98 on the opposite end of the shank 93. In use the locking bolt lower end 96 passes through the housing plates 24 and 26 if the hitching bar member is positioned within the housing; otherwise the locking bolt end 96 will rest on the end portion of the pivotal wedge member 56. FIG. 2 shows the locking bolt 86 in a raised position with the hitch 10 in the storage position wherein the end 96 is adjacent to the upper plate member 24. With the cushion adjustable swing hitch 10 in the normal use position the locking bolt 86 has the end portion 96 extended through the aperture 82 in the cushion member 22. When the hitch 10 is in the storage position the locking bolt end 96 extends through the connecting aperture 43 and the hitching bar outer end portion 62. When the cushioned hitch 10 is in the extended and/or pivoted position such as shown in FIG. 1 and FIG. 5 the locking bolt 86 has the lower end 96 resting on the outer end portion of the wedge member 56 thereby preventing its passage through the space between the plates 24 and 26. When the hitch 10 is moved from the extended position as shown in FIG. 6 to the normally used position shown in FIG. 3 or the storage position shown in FIG. 4, the wedge member 56 is pivoted as the side of the hitching bar member 16 contacts it and rotates it; at this time the locking bolt end 86 slides over the outer end 62 of the hitching bar member 16 and will pass into the cushion member aperture 82 when same is directly below the locking bolt thereby eliminating the need for manually lifting the locking bolt 86 when it is desired to move the hitch from a pivoted position to the normally used position. In order to change the hitch from the normal use position to the storage position, one must manually lift the locking bolt by raising the handle portion 98 to remove its lower end 96 from the cushion aperture 82. As the hitch 10 is moved from the normally used position to the swung-out or pivoted position, the wedge 56 as it is urged by the spring 60 will follow the hitching outer end portion 62 and prevent the locking bolt 86 from passing through the space between the plates 24 and 26 after the hitching bar moves past the upper plate locking bolt aperture 43.

The cushioned adjustable swing hitch 10 of this invention is constructed so that it can be easily bolted to a conventional and popular style safety bumper. Nearly all safety bumpers have the same general structural features as the bumper 14 shown in FIG. 1, and the cushioned adjustable swing hitch 10 is constructed so that it can be easily mounted without modification on most of the conventional styles and makes of safety bumpers. Generally, a conventional safety bumper has a center portion with a horizontal plate portion with apertures through the plate for coupling the bumper with other vehicles either by the use of trailer balls or clevis hitch pins or other coupling devices. The cushioned adjustable swing hitch 10 has the housing 18 bolted to the horizontal plate portion below the bumper and the locking bolt assembly 20 secured by the same bolts to the upper side of the horizontal plate. The hitch 10 is sized so that on most bumpers the left side of the hitch having the floating block assembly 34 can be bolted through one of the existing apertures in the horizontal plate, and the right hand side thereof by virtue of the elongated aperture 44 will match another existing aperture in the horizontal plate. Proper positioning of the hitch should align the elongated apertures 47 and 48 with an existing aperture 102 in the bumper; however, it may be necessary to make the aperture 102 in the bumper. The apertures 47 and 48 are used in off-center towing as will be described hereinafter. Depending upon the specific bumper, it may be necessary to make an aperture therethrough the horizontal plate portion thereof for the locking bolt 86.

It is to be noted that the cushioned adjustable swing hitch for vehicles 10 of this invention can be mounted with a vehicle safety bumper of the kind described. However, the hitch structure is not to be limited to use with a safety bumper in the specific installation shown; the hitch 10 can be welded to the vehicle bumper or constructed integrally with it and function similarly with the same structural elements.

Use of the cushioned adjustable swing hitch 10 is illustrated in the drawings. The normal use position of the cushioned hitch 10 is as shown in FIG. 1 and FIG. 3 wherein the locking bolt 86 passes through the cushion member aperture 82, and the hitching bar member outer end portion 62 extends to the rear of the vehicle bumper for coupling of a towed vehicle thereto. The storage position of the cushioned adjustable hitch 10 is shown in FIG. 4 wherein the locking bolt 86 passes through the connecting aperture 72 or the hitching bar's outer end portion to retain the hitching bar member 16 in the storage position; in this position no portion of the hitch 10 extends rearward past the rear side of the bumper 14. Another use position of the cushioned adjustable swing hitch 10 is shown in dashed lines of FIG. 5 wherein the hitching bar member 16 is secured to the housing 18 in a translated position; in this position an auxiliary locking bolt (not shown) must be placed through an aperture 100 in the upper plate 24, through the elongated apertures 47 and 48 in the plate members 24 and 26 and through the cushion aperture 82. The pivoted, extended and translated movements of the cushioned adjustable hitch 10 are shown in FIGS. 1, 5 and 6 which illustrate the swinging action of the hitch.

The adjustable swing hitch has a swinging action usable to simplify the coupling of the towing vehicle with the towed vehicle. When the towing vehicle fitted with the cushioned hitch 10 is to be coupled with a trailer, for example, the towing vehicle is backed up to the trailer tongue so the trailer tongue is just to the left of the center of the hitch 10 and a short distance behind the rear of the bumper. Once the vehicles are in this position, the hitching bar member 16 is released to the extendable and pivotable position as illustrated in the solid lines of FIG. 5 wherein the floating block member 68 is released to move in the slot 64 so the hitching bar member 16 can be moved relative to its attachment point. In this position the hitching bar member can be freely moved within the limits of the structure in order to position its outer end portion 62 for connection with the trailer tongue. Once the hitching bar member 16 is connected with the trailer tongue, the tow vehicle is moved forward thereby pulling the hitching bar member to the full extended positon as shown in FIG. 6; then the towing vehicle is backed up rotating the hitching bar member 16 into the normal use position as shown in FIG. 3 whereupon the locking bolt 86 automatically passes through the cushion member aperture 82 and secures the hitch for towing. In the event that off-center pulling is desired for the trailer, the floating block 68 must be released to move in the slot 64 and the hitching bar member 16 secured by an auxiliary locking bolt through the elongated apertures 48 and the housing 18. In order to place the hitch in this off-center pulling position, it may be connected with the trailer similar to that described above; however, accurate backing of the towing vehicle is necessary to position the hitching bar member outer end portion 62 within the housing 18 so that the locking pin can be inserted through the apertures 48.

In the manufacture of the cushioned adjustable swing hitch for vehicles 10 of this invention, it is seen that the housing 18, hitching bar member 16 and locking bolt assembly 20 and other parts of the structure can be easily formed from standard available material stock and do not require closely machined tolerances in the production thereof. The hitch 10 can be constructed in various lengths and with different aperture spacings to facilitate easy mounting of the hitch on different makes of safety bumpers or on other bumpers. Additionally, the hitch 10 can be constructed in different sizes so as to enable it to be used with different loading capacities.

In the use and operation of the cushioned adjustable swing hitch for vehicles 10 of this invention, it is seen that same provides a cushioned hitch that is easily extended and translated into a position for easy attachment of it with the tongue of a trailer vehicle or other towed vehicles. The hitch 10 can be positioned for towing in an off-center positon as well as a normal use position directly behind the center of the towing vehicle, and additonally when not in use the hitch can be stored in a position so that none of the hitch extends rearward of the attached bumper. The hitch 10 is adapted for easy mounting with popular and conventional styles of safety bumpers and other bumpers which are commonly used on pickup trucks and other vehicles. The hitch provides a cushion between the portion thereof which is attached to a towed vehicle and the structure of the towing vehicle so as to lessen shock and impact forces which are normally transmitted between the towed vehicle and the towing vehicle in a rigid hitch.

As will become apparent from the foregoing description of the applicant's cushioned adjustable swing hitch for vehicles, relatively inexpensive and simple means have been provided to connect vehicles in a rapid manner and provide a cushioned coupling therebetween without the heretofore necessity of precisely aligning the couplings before connecting them. The cushion feature of the hitch provides for a smoother operation of the towing vehicle and a lessening of the damage to its structure due to towing. The hitch structure is easily constructed, simply to use, mountable with a conventional safety bumper and is storable out of sight within its housing so as not to extend past the bumper when it is not in use.

While the invention has been described in conjunction with preferred specific embodiments thereof, it will be understood that this description is intended to illustrate and not limit the scope of the invention, which is defined by the following claims.

I claim:

1. A hitch for vehicles, comprising:
   a. a housing having a pair of similar parallel plate members and a closed portion and mountable under the rear bumper of a vehicle,
   b. bar means hitching means mounted within said housing and having a bar member with an elongated opening therein mounted about a floating member pivotally connected to and between said plate members, said bar member movable to a radial position limited to the length of said opening and from the pivotal connection of said floating member, movable rearwardly of the outer edge of said plate members to a storage position within said housing wherein a portion of said bar member is contained within said closed portion of said housing,
   c. means pivotally, extendably and translatably mounting said hitching means on said housing,
   d. resilient means urged locking means mounted with said housing and with said vehicle bumper constructed and adapted to lock said hitching means against rotation and extension,
   e. resilient cushion means with said bar member to receive said locking means, and
   f. resilient means ejecting means mounted within said closed portion of said housing constructed and adapted to force said bar member from said closed portion of said housing and from said storage position,
   said hitch for vehicles adapted to be mounted on the rear of a vehicle, said hitching means translatably positionable on said housing to a fixed position and said hitching means rotatably extendable and translatably extendable from said housing and couplable with a trailing vehicle or the like, and retractable to said storage position.

2. A hitch for vehicles as described in claim 1, wherein:
   a. said bar means is movable laterally within said housing to a second fixed position for offset coupling with a trailing vehicle, and
   b. said hitching means is movable to said storage position having said resilient ejecting means compressed within said closed portion of said housing and without any portion of said hitching means extending rearwardly of said housing so that the vehicle can be pushed from the rear if desired.

3. The hitch for vehicles as described in claim 2, wherein:
   a. said locking means has a resiliently urged pin member mountable above said rear bumper, extendable through an aperture in said bumper, and through a locking pin aperture in said housing to engage said resilient cushion means, and
   b. said locking means has a locking pin holding means pivotally mounted between said plate members and resiliently urged to cover and hold said locking pin member above the space between said plate members when said hitching means is extended from said housing.

4. A hitch for vehicles, comprising:
   a. mounting means mountable on a vehicle,
   b. hitching means,
   c. means to pivotally, extendably and translatably mount said hitching means on said mounting means,
   d. resilient means urged locking means mounted on said vehicle and mounted with said mounting means, constructed and adapted to lock said hitching means against rotation and extension,
   e. said hitching means is a bar means mounted within said housing,
   f. said mounting means include a pair of similar parallel plate members joined on a side portion forming a partial enclosure,
   g. said mounting means has a bar means ejector means mounted within said enclosure, constructed and adapted to force said bar means out of said enclosure from a storage position,
   h. said mounting means is mounted on the vehicle so that said hitching bar means is horizontally extendable therefrom,
   i. said hitching bar means has an elongated bar-like member extending substantially the length of said housing,
   j. said means to pivotally, extendably and translatably mount said hitching means is an elongated slot-like aperture therethrough and substantially the length thereof said hitching bar means having a floating member therein pivotally attached to said housing between said plate member adapted to be positionable at one end of said slot by a portion of said resilient urged locking means having a leaf spring member attached at one end to an inner side of said slot compressibly positioned in the center of said slot and adapted to be compressed at the free end thereof to provide movement of said floating member through said slot, and
   k. said hitching bar member has a cushion means on the extendable end thereof engagable with said rotation locking means in operation to absorb shock loading forces imparted said hitching bar member when in use.

5. A hitch for vehicles as described in claim 4, wherein:
   a. said housing has a stop member therebetween said plate members positioned so as to be adapted to prevent said bar member from rotating over the center of rotation about said floating member,
   b. said rotation locking means has a spring urged locking pin member normally extended with the end portion thereof extendable through a locking pin aperture in said plate members engagable with said cushion means, c. said spring urged locking pin member is retractable from said normally extended position to engage said rotation locking means by finger pressure, d. said cushion means has an aperture therethrough to receive said locking pin member end portion in said normally extended position with said bar member in a normal use position, and e. said bar member has a hitch connecting aperture through the end portion thereof exposed when in said normal use position, said hitch connecting aperture is constructed and adapted to receive said locking pin member when said hitch is in said storage position.

6. A hitch for vehicles as described in claim 5, wherein:

a. said housing has a plurality of apertures therethrough said plate members adapted to be used to mount same with said vehicle, b. one of said plate members of said housing has an enlarged aperture therethrough adapted to provide finger access to said extension lock means for compressing said leaf spring member at the floating member end portion threof, and c. said rotation locking means has a spring urged locking pin holding member pivotally mounted between said plates, urged by said spring to a normal position covering said locking pin aperture in said plate member when said hitching bar member is in a swung-out position and moved to a pivoted retracted position by contacting the outer end portion of said hitching bar member when same is in said normal use position, or said storage position.

7. A hitch means for vehicles as described in claim 6, wherein:

a. said cushion means has said resilient member removably mounted with said hitching bar member, and b. said resilient member has a lined aperture therethrough same for the receipt of said locking pin member.

\* \* \* \* \*

UNITED STATES PATENT OFFICE
CERTIFICATE OF CORRECTION

Patent No. 3,782,760  Dated January 1, 1974

Inventor(s) Frederick W. Mann

It is certified that error appears in the above-identified patent and that said Letters Patent are hereby corrected as shown below:

Column 1, line 12, correct the spelling of "positions".

Column 2, lines 22-23, correct the spelling of "aforementioned".

Column 8, line 57, correct the spelling of "additionally".

Column 11, line 2, delete "engage", and insert therefor ---disengage---.

Column 12, line 2, correct the spelling of "thereof".

Signed and sealed this 4th day of March 1975.

(SEAL)
Attest:

RUTH C. MASON
Attesting Officer

C. MARSHALL DANN
Commissioner of Patents
and Trademarks